(12) United States Patent
Liu et al.

(10) Patent No.: US 7,711,669 B1
(45) Date of Patent: *May 4, 2010

(54) CONFIGURABLE HIERARCHICAL CONTENT FILTERING SYSTEM

(75) Inventors: Shousen Robert Liu, San Jose, CA (US); Caigong Qin, Cupertino, CA (US)

(73) Assignee: Trend Micro Incorporated, Tokyo (JP)

(*) Notice: Subject to any disclaimer, the term of this patent is extended or adjusted under 35 U.S.C. 154(b) by 36 days.

This patent is subject to a terminal disclaimer.

(21) Appl. No.: 12/178,784

(22) Filed: Jul. 24, 2008

Related U.S. Application Data

(63) Continuation of application No. 11/504,174, filed on Aug. 15, 2006, now Pat. No. 7,406,454.

(51) Int. Cl.
*G06F 17/00* (2006.01)
*G06N 5/00* (2006.01)

(52) U.S. Cl. ....................................... 706/45
(58) Field of Classification Search ................... 706/45
See application file for complete search history.

(56) References Cited

U.S. PATENT DOCUMENTS

| | | | |
|---|---|---|---|
| 5,623,600 | A | 4/1997 | Ji et al. |
| 6,195,587 | B1 | 2/2001 | Hruska et al. |
| 6,198,727 | B1* | 3/2001 | Wakeley et al. ............ 370/247 |
| 6,574,664 | B1* | 6/2003 | Liu et al. .................... 709/224 |
| 6,938,097 | B1 | 8/2005 | Vincent et al. |
| 7,010,807 | B1 | 3/2006 | Yanovsky et al. |
| 7,099,853 | B1* | 8/2006 | Liu et al. ...................... 706/45 |
| 7,299,277 | B1 | 11/2007 | Moran et al. |
| 7,406,454 | B1* | 7/2008 | Liu et al. ...................... 706/45 |
| 7,606,214 | B1* | 10/2009 | Chandra Sekhar et al. .. 370/351 |
| 7,634,479 | B2* | 12/2009 | Liu .............................. 707/10 |

OTHER PUBLICATIONS

Wack, et. al., "Guide to Firewall Selection and Policy Recommendations", Oct. 2001, 64 pages, National Institute of Standards and Technology (NIST) special publication.

Microsoft TechNet "Unsolicited Commercial E-Mail Prevention and Filtering Performance Analysis", Jan. 1999, pp. 1-14, retrieved from the internet: http://www.microsoft.com/technet/archive/mcis/rkspmcpa.mspx?pf=true.

Martin Roesch, "Snort—Lightweight Intrusion Detection for Networks", 1999, pp. 229-238 of the 13th LISA Conference proceedings. Retrieved from the Internet: http://www.usenix.org/events/lisa99/full_papers/roesch/roesch_html/.

* cited by examiner

*Primary Examiner*—Michael B Holmes
(74) *Attorney, Agent, or Firm*—Okamoto & Benedicto LLP

(57) ABSTRACT

In one embodiment, a content filtering system scans an incoming data for malicious content against a portion or the entirety of its knowledge base. If the incoming data is not detected to contain malicious content, the incoming data is forwarded to a content filtering agent that may perform further scanning of the incoming data against portions of its knowledge base that were not employed by the content filtering system. This advantageously allows a complete knowledge base to be segmented, with different computers scanning an incoming data using different segments of the knowledge base. The content filtering system and content filtering agent may be antivirus programs, while the knowledge bases may be virus/pattern files, for example.

11 Claims, 3 Drawing Sheets

CONFIGURABLE HIERARCHICAL CONTENT FILTERING SYSTEM

REFERENCE TO RELATED APPLICATION

This application is a continuation of U.S. application Ser. No. 11/504,174, filed on Aug. 15, 2006, now U.S. Pat. No. 7,406,454, which is a continuation of U.S. application Ser. No. 10/774,620, filed on Feb. 9, 2004, now U.S. Pat. No. 7,099,853, both of which are incorporated herein by reference in their entirety.

BACKGROUND OF THE INVENTION

1. Field of the Invention

The present invention relates generally to data processing, and more particularly but not exclusively to scanning of data for malicious content.

2. Description of the Background Art

Content filtering systems are employed in computer systems to scan incoming data for malicious content, such as computer viruses, spam, unwanted content, and unauthorized network intrusion. A content filtering system typically includes a knowledge base against which an incoming data is compared. An example knowledge base is the pattern file of an antivirus program. A pattern file contains the patterns or signatures of known viruses. An antivirus program compares the contents of an incoming data against the contents of a pattern file to determine if the data has a virus. A pattern file is periodically updated to include the patterns of newly discovered viruses.

The size of a knowledge base increases as the knowledge base is updated to include more information. In the case of antivirus programs, pattern files get larger as more viruses are discovered. The increasing size of a knowledge base strains the resources (e.g., storage and processor) of the computer running the content filtering system. This problem is especially significant with computing devices that are not easily upgradeable.

SUMMARY

In one embodiment, a content filtering system scans an incoming data for malicious content against a portion or the entirety of a knowledge base. If the incoming data is not detected to contain malicious content, the incoming data is forwarded to a content filtering agent that may perform further scanning of the incoming data against portions of its knowledge base that were not employed by the content filtering system. This advantageously allows a complete knowledge base to be segmented, with different computers scanning an incoming data using different segments of the knowledge base. The content filtering system and content filtering agents may be antivirus programs, while the knowledge bases may be virus/pattern files, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Figure 1:
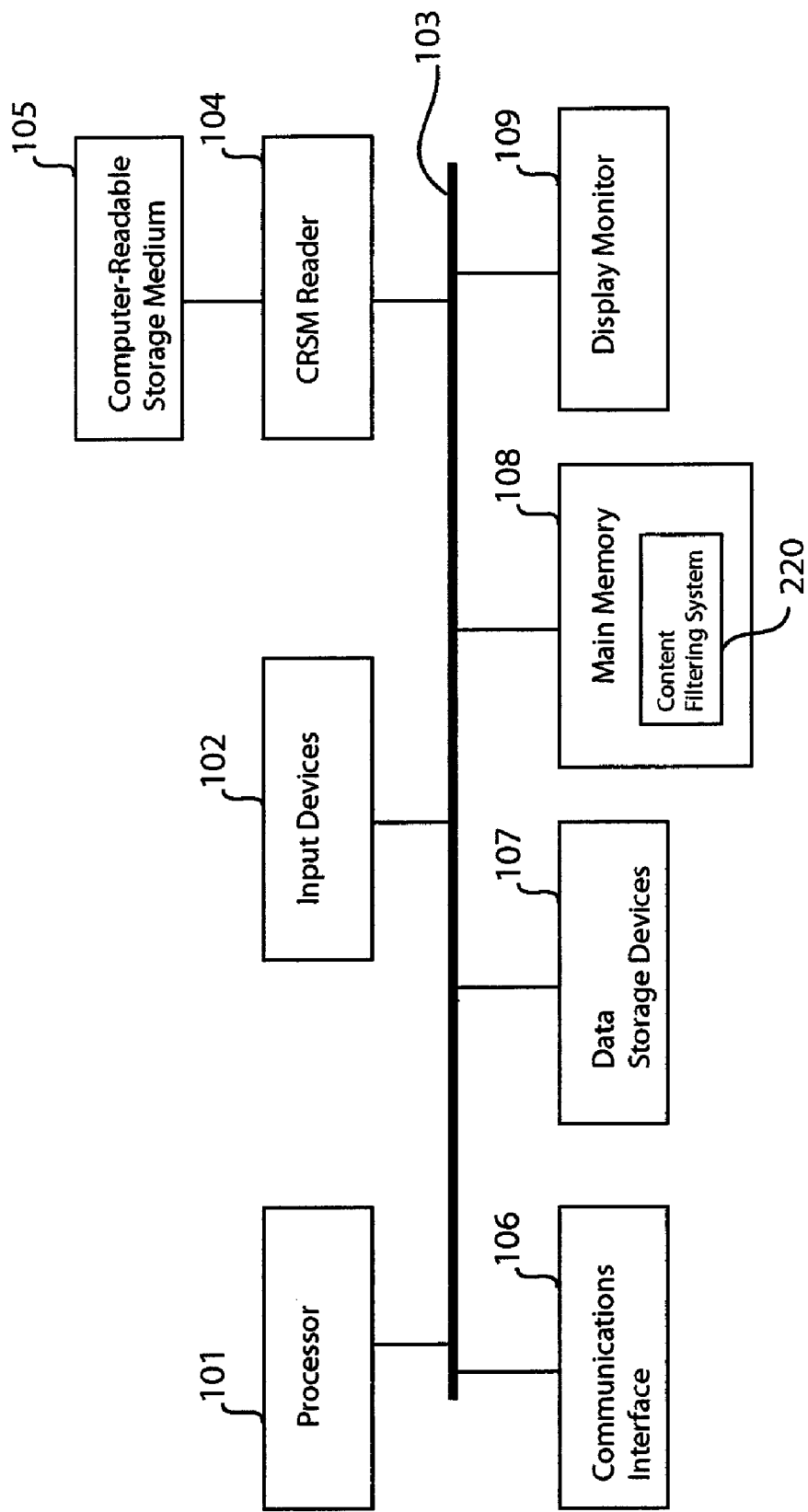
FIG. 1 shows a schematic diagram of an example computer that may be used in embodiments of the present invention.

Referring now to FIG. 1, there is shown a schematic diagram of an example computer that may be used in embodiments of the present invention. Depending on its configuration, the computer shown in the example of FIG. 1 may be employed as a desktop computer, an appliance, or a server computer, for example. The computer of FIG. 1 may have less or more components to meet the needs of a particular application. As shown in FIG. 1, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. In the example of FIG. 1, main memory 108 may be configured to include a content filtering system 220, which is further discussed below. A content filtering system 220 may be executed by processor 101.

Figure 2:
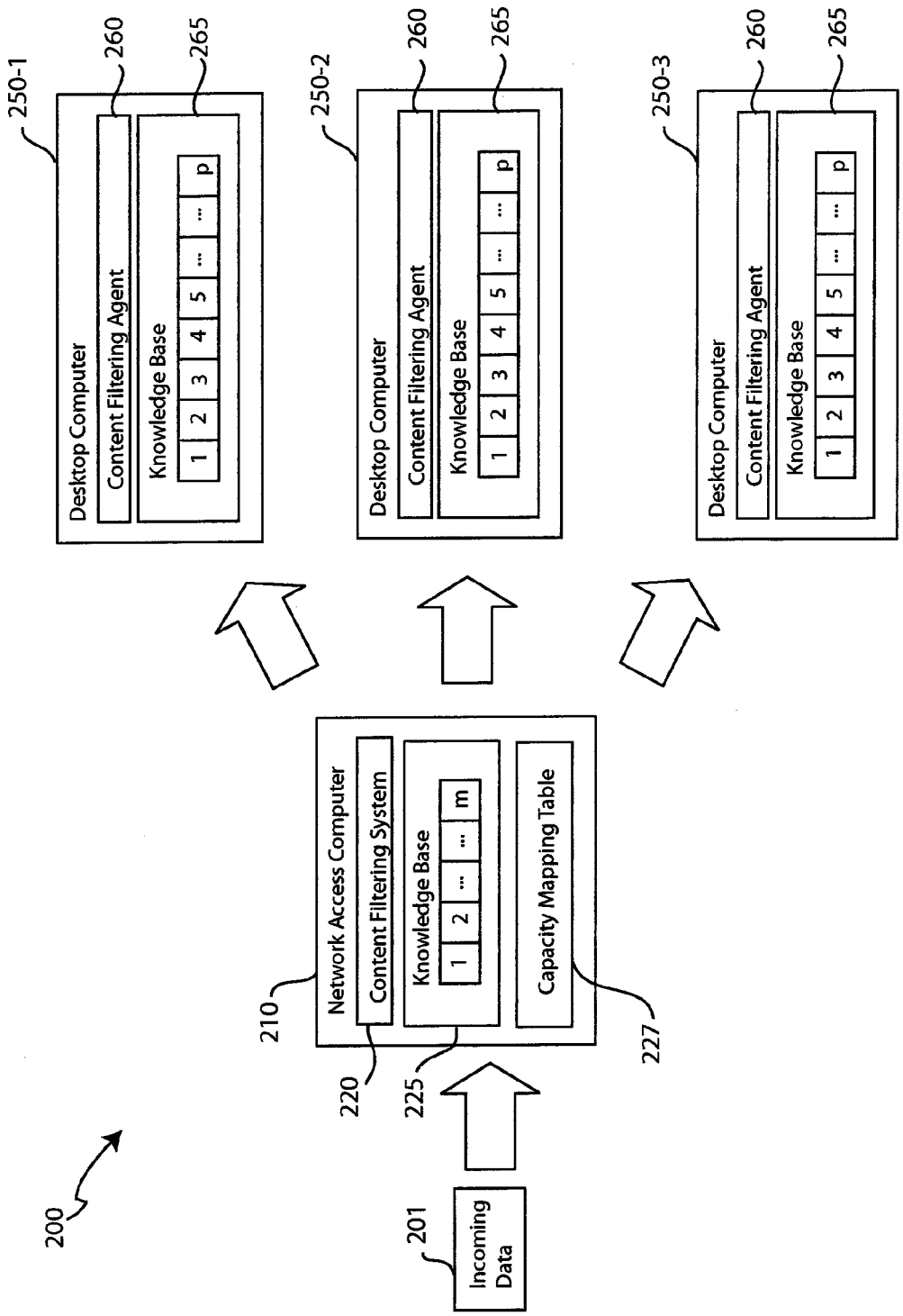
FIG. 2 schematically shows a system for filtering the content of an incoming data in accordance with an embodiment of the present invention.

FIG. 2 schematically shows a system 200 for filtering the content of an incoming data 201 in accordance with an embodiment of the present invention. System 200 includes a network access computer 210 and one or more desktop computers 250 (i.e., 250-1, 250-2, ...). Network access computer 210 may be coupled to desktop computers 250 over a computer network, such as a local area network, a wide area network, an Intranet, or the Internet, for example. In one embodiment, desktop computers 250 are on a private network that is coupled to the Internet via network access computer 210. That is, network access computer 210 may serve as a gateway, router, or other type of network access device for the private network.

In one embodiment, network access computer 210 comprises a gateway security appliance. Generally speaking, an "appliance" is a special-purpose, standalone computer. Unlike a typical server computer, an appliance ordinarily has limited resource capacities, such as processor speed and memory, to keep the cost of the appliance down. To keep its footprint small and to make it easier to integrate into an existing computer network, an appliance is also typically packaged in a way that makes it relatively difficult or impossible to upgrade. Examples of appliances for content filtering include the GateLock™ appliances from Trend Micro, Inc. It is to be noted that network access computer 210 may also be a general-purpose computer. As will be more apparent below, some embodiments of the present invention are especially beneficial in older computers or those with limited resource capacities.

Network access computer 210 may include a content filtering system 220, a knowledge base 225 and a capacity mapping table 227. For purposes of the present disclosure, the term "content filtering system" refers to a system for detecting malicious content in data and employs a knowledge base to compare with a data stream. Malicious content may be a computer virus, spam or unsolicited emails, unwanted content, and unauthorized network intrusion, for example. Content filtering system 220 may be implemented in hardware (e.g. ASIC), software, or combination of hardware and software (e.g. firmware). Content filtering system 220 may be an antivirus, spam prevention, or network security program, for example.

Knowledge base 225 may be a data file, such as a virus pattern/signature file, an exception/inclusion list, rules list, and the like, that content filtering system 220 employs to perform its content filtering function. Content filtering system 220 compares the content of an incoming data (e.g., file, e-mail, packet) with those of knowledge base 225 to determine if the incoming data has malicious content. Knowledge base 225 may include the pattern/signature of all known computer viruses. Content filtering system 220 may thus open an incoming data and compare the content of the incoming data with virus patterns/signatures in knowledge base 225 to determine if the incoming data has a virus. If so, content filtering system 220 may invoke a conventional antivirus engine to remove the virus from the incoming data. Knowledge base 225 may include a list of rules for determining if an incoming data includes spam, a Trojan horse, and other malicious content. For example, knowledge base 225 may include rules on how to detect hacker or virus activities, or rules on how to detect spam in emails. Knowledge base 225 may also include an exception list, white list or black list. For example, if content filtering system 220 is employed to block incoming data from certain domains on the Internet, knowledge base 225 may include a list of those domains that are to be blocked (a black list) or are always allowed (a white list). This allows content filtering system 220 to use knowledge base 225 as a look up table to determine whether a domain is to be blocked or allowed. As can be appreciated, the content of a knowledge base 225 depends on the specific application.

In one embodiment, knowledge base 225 is segmented in that it is divided into several useable segments labeled as 1, 2, ... m in the example of FIG. 2. That is, knowledge base 225 may be divided into several portions, with each portion being useable by itself. For example, each segment of knowledge base 225 may include a certain number of computer virus patterns. Content filtering system 220 may thus compare the content of an incoming data 201 to virus patterns in segments 1-3 of knowledge base 225, or to virus patterns in segments 1-7 of knowledge base 225, or to virus patterns in segments 6-10 of knowledge base 225, and so on. A segmented knowledge base 225 advantageously allows content filtering system 220 to use the entirety or some portion of knowledge base 225 depending on the resource capacity of network access computer 210 or desktop computers 250.

Capacity mapping table 227 may be a table or data structure containing information on the resource capacities of desktop computers 250. A resource capacity may be processor speed or storage space, for example. Capacity mapping table 227 may have a capacity index that reflects the resource capacity of a desktop computer 250. The higher the capacity index, the more powerful the desktop computer 250. For example, if desktop computer 250-1 has a faster processor and larger memory than desktop computer 250-2, desktop computer 250-1 would have a higher capacity index than desktop computers 250-2. In one embodiment, content filtering system 220 checks capacity mapping table 227 to determine the amount of knowledge base 225 to employ in scanning incoming data 201. Content filtering system 220 may determine the designated destination computer of incoming data 201, determine the resource capacity of the destination computer by checking capacity mapping table 227, and then use an amount of knowledge base 225 based on the resource capacity of the destination computer. For example, if the destination computer has a fast processor, content filtering system 220 may employ a small portion of knowledge base 225 to scan incoming data 201. In that case, more scanning of incoming data 201 will be performed in the destination computer. If the destination computer has a slow processor or has limited memory capacity, content filtering system 220 may employ the entirety of knowledge base 225 to scan incoming data 201.

A desktop computer 250 may be any type of computer employed by an end user. For example, a desktop computer 250 may be a personal computer or a workstation. A desktop computer 250 may include a content filtering agent 260 and a knowledge base 265.

Like content filtering system 220, a content filtering agent 260 looks for malicious content in an incoming data by scanning the incoming data against a knowledge base, which is labeled as knowledge base 265 in desktop computers 250. A content filtering agent 260 may be an antivirus, spam prevention, or network security program, for example. That is, a content filtering agent 260 may scan an incoming data for computer viruses, spam, or unauthorized network intrusion. A content filtering agent 260 may be platform dependent. For example, a desktop computer 250 with an Intel™ processor may be running a content filtering agent 260 for the Microsoft Windows™ operating system, a desktop computer 250 with a PowerPC™ processor may be running a content filtering agent 260 for the Mac OS™ operating system, and so on.

A knowledge base 265 may be a data file, such as a virus pattern/signature file, an exception/inclusion list, rules list, and the like, that a content filtering agent 260 employs to perform its content filtering function. In one embodiment, a knowledge base 225 is a subset of knowledge base 265. That is, both knowledge bases are similar except that a knowledge base 265 may have more information than knowledge base 225. Accordingly, a knowledge base 265 may also be a segmented knowledge base, with each segment being a useable portion. For example, given a complete (i.e., full set) knowledge base having segments 1 to p, a knowledge base 265 may have segments 1 to p, while knowledge base 225 may have segments 1 to m, where $p \geq m$. This allows content filtering system 220 to scan incoming data 201 using segments 1 through m of knowledge base 225, and content filtering agent 260 to continue the scanning of incoming data 201 using segments (m+1) through p (if p>m) of the knowledge base 265.

As can be appreciated, the amount of knowledge base to be used in network access computer 210 and in a desktop computer 250 may be balanced to take into account the resource capacities of desktop computers 250. A network administrator may manually enter the resource capacity of each desktop computer 250 in capacity mapping table 227. The resource capacity of each desktop computer 250 may also be automatically obtained and entered in capacity mapping table 227 via negotiation between network access computer 210 and desktop computers 250 using conventional network management protocols, for example. As mentioned, the resource capacity of a desktop computer 250 may be in the form of a capacity index. The capacity index may directly or indirectly reflect the number of segments of knowledge base 225 to employ in the scanning of an incoming data 201 in network access computer 210. The capacity index may also be based on some algorithm or formula that takes into the account the processing speed and memory size of the corresponding desktop computer 250.

As a specific example, incoming data 201 may be a file being transferred over the Internet to desktop computer 250-3. As the gateway security computer for the network including desktop computer 250-3, network access computer 210 will receive incoming data 201 before incoming data 201 reaches desktop computer 250-3. In network access computer 210, content filtering system 220 determines the destination address of incoming data 201, which in this particular example is desktop computer 250-3. Content filtering system 220 then checks the resource capacity of desktop computer 250-3 by consulting capacity mapping table 227. If it turns out that desktop computer 250-3 is a slow computer, content filtering system 220 may employ the entirety (e.g., segments 1 to m) of knowledge base 225 to scan incoming data 201. On the other hand, if desktop computer 250-3 is a fast computer, content filtering system 220 may employ only a small portion (e.g., segments 1 to f, where f<m) of knowledge base 225 to scan incoming data 201. If the incoming data 201 has malicious content, content filtering system 220 may take predetermined steps to address the situation. Otherwise, network access computer 210 may forward incoming data 201 to desktop computer 250-3. There, a content filtering agent 260 scans incoming data 201 using segments of knowledge base 265 that were not used by knowledge base 225. For example, if content filtering system 220 used segments 1 to 60 of knowledge base 225, the content filtering agent 260 may use segments 61 to p (with p being the last segment) of the knowledge base 265.

In light of the present disclosure, those of ordinary skill of the art will appreciate that embodiments of the present invention allow a computer to be employed with an ever growing knowledge base without necessarily having to perform a hardware upgrade. This beneficially increases the useable lifetime of a computer. For example, if network access computer 210 cannot handle additional segments for knowledge base 225 due to insufficient processor speed or memory capacity, those additional segments may be included in the knowledge base 265 of desktop computers 250. Alternatively, network access computer 210 may retain the newest segments and off load the older segments to desktop computers 250. Embodiments of the present invention allow older or limited-resource computers to be used in content filtering applications by offloading more of the scanning function to faster computers. Embodiments of the present invention improve the overall performance of a content filtering system by shifting more of the scanning function to faster computers, thus balancing the scanning load among computers on the network. Thus, embodiments of the present invention may be employed to increase the overall performance of a content filtering system regardless of whether the processor or memory limitations of a network access computer has been reached. Furthermore, embodiments of the present invention allow for the scanning load to be divided among several computers in daisy-chain fashion. That is, a first computer may scan an incoming data using segments 1-7 of a knowledge base, a second computer may scan the incoming data using segments 8-13 of a knowledge base, a third computer may scan the incoming data using segments 14-20 of the knowledge base, and so on.

Embodiments of the present invention are especially useful in antivirus applications, where virus pattern/signature files are constantly updated (e.g., by receiving updates over the Internet) to keep up with new viruses.

Figure 3:
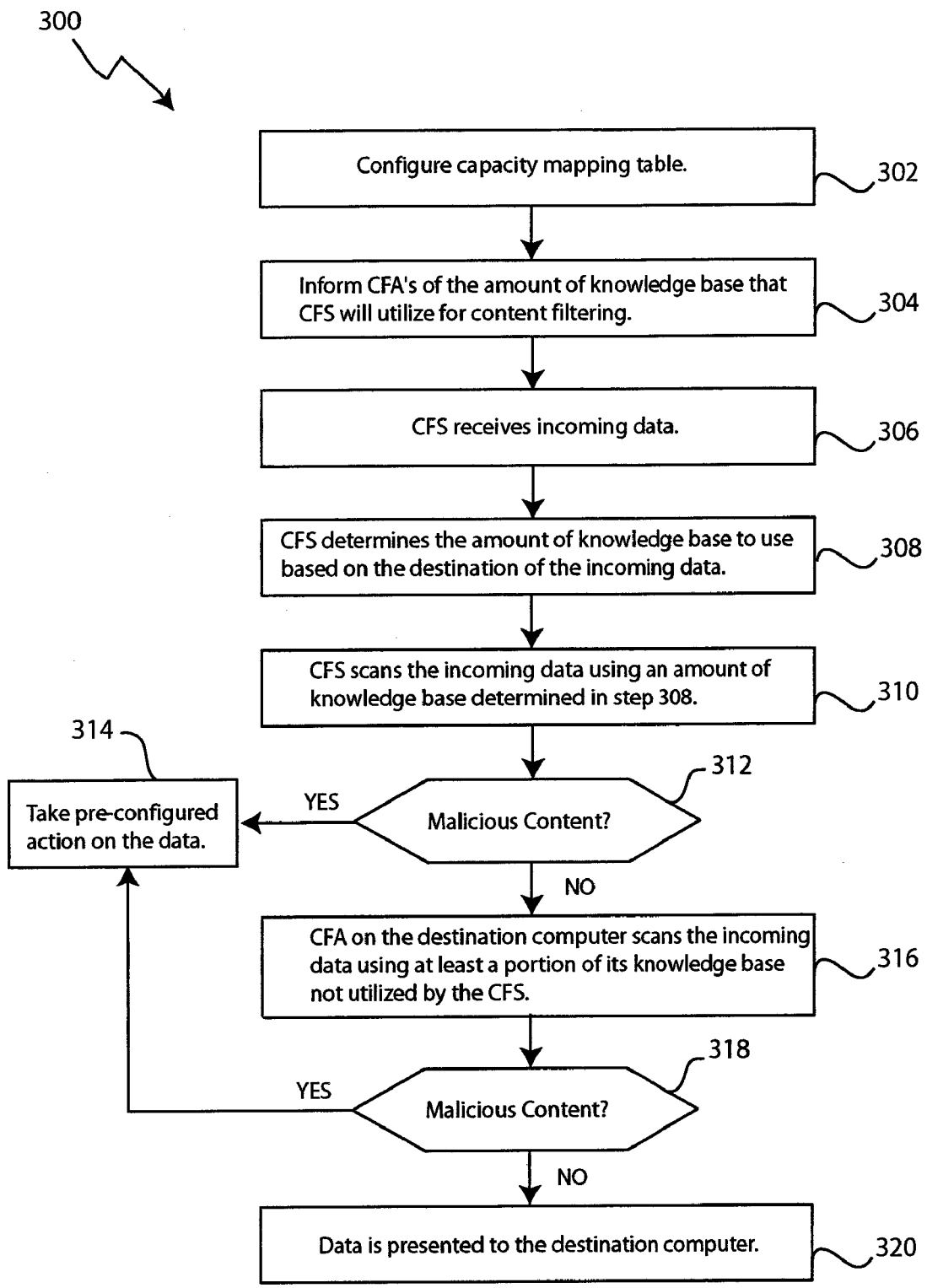
FIG. 3 shows a flow diagram of a method of filtering data in a computer network in accordance with an embodiment of the present invention.

Turning now to FIG. 3, there is shown a flow diagram of a method 300 of filtering data in a computer network in accordance with an embodiment of the present invention.

Method 300 will be described with reference to the components shown in FIG. 2 for illustration purposes only. It is to be understood that method 300 may also be performed using other components without detracting from the merits of the present invention.

In step 302, a capacity mapping table containing information indicative of the resource capacities of desktop computers in the network is configured. In one embodiment, the capacity mapping table is stored in a network access computer serving as a gateway security node for the network. The capacity mapping table may be manually configured by a network administrator, or automatically configured via negotiations between the network access computer and desktop computers in the network using a conventional network management protocol. The resource capacity for each desktop computer may be in the form of a capacity index that directly or indirectly translates to the number of knowledge base segments a content filtering system (CFS) in the network access computer will employ to scan an incoming data.

In step 304, the content filtering agent (CFA) in each desktop computer in the network is informed of the amount of scanning to be performed by a content filtering system in the network access computer. In one embodiment, step 304 is performed by the content filtering system by consulting the capacity mapping table to determine the capacity index for each desktop computer in the network, and providing each capacity index to its corresponding desktop computer. This allows the content filtering agents to know how much scanning will be performed by the content filtering system, and then to use portions of their knowledge base not already employed by the content filtering system. In this particular example, the knowledge base in the network access computer is a subset of the knowledge base in the desktop computers. That is, the knowledge bases in the network access computer and in the desktop computers are essentially the same except those in the desktop computers have more segments (e.g., more virus patters/signatures, more rules, etc.).

In step 306, the content filtering system (CFS) receives an incoming data. In one embodiment, the incoming data is received over the Internet. The incoming data may be a file, an e-mail, a packet, or other types of data that may be transmitted over a computer network.

In step 308, the content filtering system determines the designated destination (i.e. the final destination) computer of the incoming data. For example, the content filtering system may examine a header embedded in or accompanying the incoming data to find out its destination address. The content filtering system then determines the amount of knowledge base to use based on the designated destination of the incoming data. In one embodiment, the content filtering system consults the capacity mapping table for the capacity index of the designated destination computer. The content filtering system then uses an amount of its knowledge base equal or proportional to the capacity index.

In step 310, the content filtering system scans the incoming data using an amount of its knowledge base determined in step 308. As a particular example, assuming the destination computer has a capacity index of 30, the content filtering system may compare the content of the incoming data with the first 30 segments of its knowledge base in the network access computer.

In steps 312 and 314, the content filtering system takes a pre-configured action on the incoming data if the scanning indicates that the incoming data has malicious content (e.g., virus, spam, etc.). The pre-configured action or actions depend on the type of malicious content discovered by the scanning. For example, the content filtering system may remove or initiate the removal of a virus, spam, etc.

In steps 312 and 316, the content filtering system forwards the incoming data to the destination computer if the incoming data is not detected to contain malicious content. In the destination computer, the content filtering agent scans the incoming data using at least a portion of its knowledge base not utilized by the content filtering system. As a particular example, assuming a complete (i.e., full set) knowledge base having segments 1-100 and the content filtering system used segments 1-30 of its knowledge base in the network access computer, the content filtering agent may use segments 31-100 of its knowledge base in the destination computer. As can be appreciated, this allows a content filtering system and one or more content filtering agents to divide the load of scanning an incoming data against a relatively large knowledge base.

In steps 318 and 314, the content filtering agent takes a pre-configured action on the incoming data if the scanning indicates that the incoming data has malicious content (e.g., virus, spam, etc.). The pre-configured action or actions depend on the type of malicious content discovered by the scanning. For example, the content filtering agent may remove or initiate the removal of a virus, spam, etc.

In step 320, if the scanning in the destination computer indicates that the incoming data has no malicious content, the incoming data may be presented to the destination computer (e.g., allow complete access to the incoming data, put the incoming data to an inbox of a client e-mail program, allow other programs to use the incoming data, etc.).

While specific embodiments of the present invention have been provided, it is to be understood that these embodiments are for illustration purposes and not limiting. Many additional embodiments will be apparent to persons of ordinary skill in the art reading this disclosure. For example, although embodiments of the invention have been described in the context of scanning data entering a network through a network access device towards a desktop computer, embodiments of the present invention may also be employed in the other direction, such as for scanning data leaving the network from the desktop computer and out through the network access computer. As a particular example, in a case where the complete knowledge base has 100 segments, the desktop computer may first scan an outgoing data using segments 60-100, while the network access device may thereafter scan the outgoing data using segments 1-59 before the outgoing data is forwarded out of the network. Thus, the present invention is only limited by the following claims.

What is claimed is:

1. A method of scanning data in a computer network, the method comprising:
    scanning data against a knowledge base of a first computer;
    forwarding the data from the first computer to a second computer over a computer network after the data has been scanned against the knowledge base of the first computer; and
    scanning the data against a knowledge base of the second computer, the scanning of the data against the knowledge base of the second computer being performed based on the scanning of the data against the knowledge base of the first computer.

2. The method of claim 1 wherein the data is scanned against the first knowledge base of the first computer and against the second knowledge base of the second computer for malicious content.

3. The method of claim 2 wherein the malicious content comprises computer viruses.

4. The method of claim 2 wherein the malicious content comprises spam.

5. The method of claim 2 wherein the malicious content comprises unauthorized intrusion into the computer network.

6. The method of claim 1 wherein the data comprises a file.

7. A method of scanning data in a computer network, the method comprising:
    scanning data against a knowledge base of a first computer based on scanning to be performed on the data by a second computer;
    forwarding the data from the first computer to the second computer; and
    scanning the data against a knowledge base of the second computer based on scanning of the data performed by the first computer.

8. The method of claim 1 wherein the data comprises a file.

9. The method of claim 1 wherein the data is scanned against the knowledge base of the first computer and the knowledge base of the second computer for malicious content.

10. The method of claim 9 wherein the malicious content comprises a computer virus.

11. The method of claim 9 wherein the malicious content comprises spam.

* * * * *

UNITED STATES PATENT AND TRADEMARK OFFICE
CERTIFICATE OF CORRECTION

PATENT NO. : 7,711,669 B1
APPLICATION NO. : 12/178784
DATED : May 4, 2010
INVENTOR(S) : Shuosen Robert Liu et al.

It is certified that error appears in the above-identified patent and that said Letters Patent is hereby corrected as shown below:

Title Pg, Item (75) Inventors: replace "Shousen Robert Liu" with

-- Shuosen Robert Liu --

Signed and Sealed this

Tenth Day of August, 2010

David J. Kappos
*Director of the United States Patent and Trademark Office*